United States Patent Office 3,536,631
Patented Oct. 27, 1970

---

3,536,631
NITROGEN OXIDES AND OXYACIDS IN REGENERATING TELLURIUM - CONTAINING CATALYSTS WITH OR WITHOUT TREATMENT USING BASIC NITROGEN COMPOUNDS
Horst Grosspietsch, Lothar Hörnig, and Günter Mau, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 20, 1967, Ser. No. 647,329
Claims priority, application Germany, Oct. 8, 1966,
F 50,391
Int. Cl. B01j *11/02*
U.S. Cl. 252—411      8 Claims

---

ABSTRACT OF THE DISCLOSURE

Process for regenerating tellurium and/or a tellurium compound containing catalysts supported on carriers, in which the catalysts supported on carriers are treated at a temperature within the range of 50 to 400° C. with gaseous mixtures containing oxides and/or oxyacids of nitrogen. The regenerated catalysts may subsequently be treated with basic nitrogen compounds and/or their salts, such as ammonia, amines, diamines, alkanolamines and salts thereof, advantageously the hydrochlorides thereof.

---

It has already been proposed to make allyl chloride or the monomethyl substitution products thereof by conducting oxygen and mixtures of olefins with 3 or 4 carbon atoms and hydrogen chloride and/or monochloroparaffins with 3 or 4 carbon atoms over catalysts containing elementary tellurium and/or tellurium compounds (cf., Belgian Pat. 665,520). To improve the effectiveness of the catalysts it has been proposed to add to them alkali metal compounds, particularly compounds of potassium, rubidium and cesium, or basic nitrogen compounds, advantageously ammonia and amines, or the salts of basic nitrogen compounds (cf., Belgian Pat. 682,780) or vanadium compounds (cf., German patent application F 50,099 IVb/12o filed on Sept. 2, 1966). The said processes generally use catalysts supported on carriers, in the presence of which the starting materials are reacted at temperatures within the range of 100 to 350° C. At the said temperatures, however, tellurium compounds are already considerably volatile, especially in the presence of hydrogen chloride. The catalysts are therefore depleted of tellurium whereby their effectiveness is reduced.

It has therefore also been proposed to produce allyl chloride and methyl substituted allyl chloride by reacting the materials in the gaseous phase using catalysts which are continuously or discontinuously moved either in cocurrent or in countercurrent to the flow of gas (cf., U.S. patent application Ser. No. 564,535 filed on July 12, 1966, now U.S. Pat. 3,462,502).

In many cases, however, the effectiveness of the catalyst diminishes after some time so that the space/time yields decrease while the bulk density of the catalyst and its carbon content are in most cases increased.

The present invention provides a process for regenerating catalysts containing tellurium and/or tellurium compounds and, if desired, alkali metal compounds and/or vanadium compounds and/or basic nitrogen compounds or their salts and which are supported on carriers and intended for use in the manufacture of allyl chloride or methyl substituted allyl chloride by the action of oxygen on (a) mixtures of olefins with 3 or 4 carbon atoms and hydrogen chloride and/or (b) monochloroparaffins with 3 or 4 carbon atoms, which comprises treating the catalysts at a temperature within the range of 50 and 400° C. with gaseous mixtures containing oxides and/or oxyacids of nitrogen.

It is advantageous in many cases to subject the catalysts, after they have been treated with oxides and/or oxyacids of nitrogen, to a treatment with basic nitrogen compounds and/or their salts at a temperature within the range of 0 to 300° C. This aftertreatment is particularly advantageous in the case of tellurium containing catalysts obtained by the process of the above Belgian Pat. 682,780 that contained basic nitrogen compounds already before the regeneration.

The regeneration is advantageously carried out by passing a gaseous mixture containing nitrogen oxides of the formula $NO_x$ in which $x$ is 1, 1.5, 2.0 or 2.5, and/or oxyacids of nitrogen of the formula $HNO_y$ in which $y$ is 2 or 3, over the catalyst to be regenerated. By passing the gaseous mixture over the catalyst, the carbon content and the bulk density of the catalyst are reduced while the amount of compounds containing carbon, particularly carbon monoxide and carbon dioxide, in the gaseous mixture leaving the regeneration zone is increased. At the same time, the nitrogen oxides and/or oxyacids of nitrogen are reduced to nitrogen oxides and/or oxyacids of nitrogen of lower oxygen content, the degree of reduction depending, among other things, on the proportion of the nitrogen oxides or oxyacids of nitrogen and on the amount of oxidizable substances contained in the catalyst.

In the process in accordance with the invention, the oxides and oxyacids of nitrogen may be used in a pure form or in admixture with one another or with gases that are inert under the reaction conditions, for example, nitrogen, noble gases or steam.

The gaseous mixtures to be used for the regeneration are advantageously mixed with elementary oxygen, for example in the form of air. When proceeding in this manner, the nitrogen oxides and/or oxyacids of nitrogen which have been wholly or partially reduced in the course of the regeneration and contains less oxygen, are reoxidized by the elementary oxygen, whereby the amount of nitrogen oxides and/or oxyacids of nitrogen required for regenerating the catalyst is reduced. Alternatively, the nitrogen oxides and/or oxyacids of nitrogen of lower oxygen content which are formed in the course of the regeneration may be reoxidized by elementary oxygen outside the regeneration zone proper and the nitrogen oxides and/or oxyacids of nitrogen of higher oxygen content so obtained may be returned to the regeneration zone. Also with this mode of working using recycle gas, the oxidation equivalents necessary for the first regeneration phase are furnished by elementary oxygen.

It is not necessary to observe determined times of stay. The regeneration temperature ranges from 50 to 400° C., advantageously from 100 to 300° C. In general a time of stay of less than 1 minute is used. The pressure to be used may be chosen from a wide range. The process may be carried out at atmospheric pressure. In many cases it is, however, advantageous to use an elevated pressure of up to 20 atmospheres. The process may also be carried out without difficulty under reduced pressure which, however, should advantageously not be below 0.1 atmosphere.

As already indicated above the catalyst, after having been treated with oxides and/or oxyacids of nitrogen, may be aftertreated with basic nitrogen compounds and/or salts. For this purpose, the catalyst is advantageously treated with a gas containing air or nitrogen in addition to ammonia and/or amine. In this case it is not necessary, either, to observe determined residence times. Regeneration is terminated as soon as the waste gas has the same concentration of ammonia and/or amine as the gas under for the regeneration. Also in this case, the recycle-gas method may be applied. In general, temperatures within the range of 0 to 300° C. and pressures within the range of 0.2 to 20 atmospheres are used. Instead of ammonia there may be used, in principle, all unsubstituted or alkanol amines that are in the gaseous state at the temperatures applied. Examples of suitable amines are the following:

(a) mono-, di- and tri-alkylamines containing identical or different alkyl groups, each alkyl group advantageously containing 1 to 6 carbon atoms;
(b) monoarylamines, for example, aniline and toluidine, and mono- and dialkyl-monoarylamines, each alkyl group advantageously containing 1 to 3 carbon atoms;
(c) cyclic amines, advantageously those in which a nitrogen atom together with 4 to 5 carbon atoms forms a ring having 5 or 6 ring members, for example, pyrrolidine, piperidine, quinoline and the C- and/or N-alkyl derivatives thereof, each alkyl group advantageously containing 1 to 3 carbon atoms;
(d) alkylene diamines with 2 to 6 carbon atoms;
(e) mono-, di- and tri-alkanolamines with 1 to 4 carbon atoms in each alkanol group.

The success of the aftertreatment is largely independent of the nature of the amine used. The period of time for which the regenerated catalyst is effective in the main reaction is, however, generally longer when amines boiling at elevated temperature are used. Mixtures of amines may also be used.

It is immaterial for the choice of the amine, which may be used, if desired, whether the catalyst to be regenerated originally contained a basic nitrogen compound and if so, which one.

The regeneration is applicable to fluidized bed and to fixed bed catalysts. The regeneration of fluidized bed catalysts, the mobility of which depends on the throughput of gas, may be carried out continuously with a partial current of catalyst which is branched off from the reaction zone of the main reaction (manufacture of allyl chloride which may be methyl substituted), then passed, if desired, through two following reaction zones for regeneration and, if desired, aftertreatment, and then returned into the reaction zone of the main reaction.

In many cases, particularly in the regeneration of fluidized bed catalysts, the after-treatment may be carried out using, instead of ammonia or amines, the salts thereof, advantageously the hydrochlorides thereof, by mixing the salts in a solid form with the catalyst.

The process in accordance with the invention is in principle applicable to the regeneration of any of the tellurium-containing catalysts refered to in the patents and the patent application indicated hereinbefore.

The nature of the carrier material on which the catalyst is supported is immaterial if the carrier material is, for example, silicic acid, silica gel, a silicate, particularly an aluminum silicate, silicon carbide, aluminum oxide, spinel, feldspar or a molecular sieve, while catalysts supported on combustible carrier materials, for example, active carbon, polystyrene resins and other organic polymers, are less suitable for use.

The regentration and the after-treatment, if desired, may not only be carried out with the use of the flowing gases but also in a discontinuous manner by introducing the gases or gaseous mixtures once or several times under pressure into an appropriate vessel containing the catalyst and relieving the formed waste gases from pressure at the end of the regeneration and the aftertreatment or between the individual introductions.

The following examples serve to illustrate the invention but are not intended to limit it.

EXAMPLE 1

(A) Preparation and use of catalyst

The reactor used consisted of a vertically arranged glass tube having a length of 130 cm. and a diameter of 4 cm. at the lower end and of 8 cm. at the upper end, the diameter being enlarged from 4 to 8 cm. at a height of 100 cm. above the bottom of the reactor. The reactor was closed at the bottom and at the top by a glass frit. The lower part of the reactor was electrically heated to 200° C. up to a height of 60 cm. above the lower glass frit. The upper part of the reactor which was 70 cm. long was maintained at 125° C. by oil heating.

In the reactor 450 g. of silica of a bulk density of 0.55 g./cc., 30 g. of tellurium metal powder and 30 g. of pulverulent ammonium chloride were placed. The three constitutents of the catalyst had grain sizes of 0.003 to 0.004 cm. and were intimately mixed before being introduced. The mixture filled the reactor up to a level of 70 cm. in the rest state. When passing a gaseous mixture of propylene, oxygen and hydrogen chloride under atmospheric pressure through the catalyst, a whirling motion similar to that of a boiling fluid was imparted to the catalyst, ascending zones of catalyst alternating rapidly and locally with descending zones. The level of the catalyst in working condition was 70 to 95 cm. depending on the throughput of gas.

With a rate of 75 N liters (N meaning under normal conditions of temperature and pressure) of propylene, 30 N liters of oxygen and 30 N liters of hydrogen chloride per hour, the level of the catalyst was 80 to 90 cm. By cooling the gaseous mixture leaving the reactor, a condensate containing about 50 g. of allyl chloride per hour was obtained.

After 400 hours the effectiveness of the catalyst began to decrease and was only about 30 g., per hour, of allyl chloride after 600 hours. After the stream of gas had been interrupted the reactor was purged with nitrogen for a short time. The catalyst then had a weight of 572 g. and contained 12.6% by weight of carbon.

(B) Regeneration of catalyst

To regenerate the catalyst in accordance with the invention, a mixture of 8 N liters, per hour, of NO and 72 N liters, per hour, of air was passed over the catalyst in the same reactor under atmospheric pressure at a temperature of 225° C. in the lower part of the reactor, and of 125° C. in the upper part of the reactor. After some time, the initially black powder acquired a red-violet and then an orange colour. After 18 hours the catalyst was almost colorless and had lost 14%, i.e., 80 g., of its initial weight of 572 g. By analysis, about 0.4% by weight of carbon was determined. The catalyst was then treated at 20° C. with a mixture of 50 N liters, per hour, of $N_2$ and 10 N liters, per hour, of $NH_3$ and then used again for making allyl chloride as described above. After a short starting period, the same yield of about 50 g., per hour, of allyl chloride was obtained.

EXAMPLE 2

Another catalyst which had been prepared in the same reactor under the same conditions as described in Example 1 and used for making allyl chloride, contained about 17.4% by weight of carbon after 750 hours and weighed 598 g.

To regenerate the catalyst, a mixture of (a) 50 N liters, per hour, of air and (b) the vapour obtained by superheating 150 g., per hour, of concentrated aqueous nitric acid to a temperature of about 150° C., was passed over the catalyst in the same reactor under atmospheric pressure at a temperature of 240° C. in the lower part of the reactor and of 135° C. in the upper part of the reactor. By cooling the gaseous mixture leaving the reactor, a condensate consisting substantially of nitric acid was obtained. The condensate was again vaporized and returned to the catalyst powder together with the air. After some time, the initially black catalyst powder acquired a red-orange colour. After 24 hours the catalyst was almost colourless and had lost 106 g., i.e., 17.7%, of its initial weight of 598 g. By analysis, a content of 0.5% of carbon was determined. The catalyst was then treated at 20° C. with a mixture of 50 N liters, per hour, of $N_2$ and 10 N liters, per hour, of triethylamine and then used again for making allyl chloride as described above. After a short starting period it yielded again 50 g. of allyl chloride per hour.

What we claim is:

1. A process for oxidizing the carbon compounds formed upon and thereby regenerating used catalysts which consist essentially of tellurium, tellurium compounds or mixtures thereof, which catalysts are supported on a carrier and are to be used for the manufacture of allyl chloride or its monomethyl substitution products, by the action of oxygen on (a) mixtures of olefins with 3 or 4 carbon atoms and hydrogen chloride or (b) monochloroparaffins with 3 or 4 carbon atoms, or (c) mixtures of olefins with 3 or 4 carbon atoms, hydrogen chloride and monochloroparaffins with 3 or 4 carbon atoms, which comprises: treating the catalyst at a temperature within the range of 50 and 400° C. with a gas of at least one member selected from the group consisting of an oxide of nitrogen of the formula $NO_x$, in which $x$ is 1, 1.5, 2 or 2.5 and an oxyacid of nitrogen of the formula $HNO_y$, in which $y$ is 2 or 3.

2. A process as claimed in claim 1, wherein the temperature is within the range of 100 and 300° C.

3. A process as claimed in claim 1 wherein the gas additionally contains gases that are inert under the reaction conditions.

4. A process as claimed in claim 1 wherein the time of stay is less than 1 minute.

5. A process as claimed in claim 1 wherein the pressure is within the range of 0.1 and 20 atmospheres.

6. A process as claimed in claim 1, wherein the used catalyst, after the treatment recited, is then treated with at least one compound selected from the group consisting of ammonia, alkylamines, the alkyl groups containing 1 to 6 carbon atoms; monoarylamines; mono- and dialkyl-monoarylamines, the alkyl groups containing 1 to 3 carbon atoms; cyclic amines, in which a nitrogen atom together with 4 to 5 carbon atoms forms a ring having 5 or 6 ring members and the C- and N-alkyl derivatives thereof, each alkyl group containing 1 to 3 carbon atoms; alkylene diamine with 2 to 6 carbon atoms; alkanolamines with 2 to 6 carbon atoms; and salts of the aforesaid substances.

7. A process as claimed in claim 6, wherein a compound is selected from the group consisting of ammonia, alkylamines, the alkyl groups containing 1 to 6 carbon atoms; monoarylamines; cyclic amines, in which a nitrogen atom together with 4 to 5 carbon atoms forms a ring having 5 or 6 ring members; alkylene diamines with 2 to 6 carbon atoms; alkanolamines with 2 to 6 carbon atoms and the selected compound is used in the gaseous state.

8. A process as claimed in claim 1 wherein the catalyst to be regenerated additionally contains an alkali metal compound or a vanadium compound or a mixture of these compounds.

References Cited

UNITED STATES PATENTS

| | | | |
|---|---|---|---|
| 2,161,066 | 6/1939 | La Lande | 252—439 |
| 2,383,711 | 8/1945 | Clark et al. | 252—416 XR |
| 2,643,269 | 6/1953 | Augustine | 252—439 XR |
| 2,963,449 | 12/1960 | Nixon | 252—411 XR |

FOREIGN PATENTS 1,437,129   3/1966   France.

DANIEL E. WYMAN, Primary Examiner

P. E. KONOPKA, Assistant Examiner

U.S. Cl. X.R.

252—416